United States Patent
Lam et al.

(10) Patent No.: US 10,997,405 B1
(45) Date of Patent: May 4, 2021

(54) METHOD, APPARATUS, AND COMPUTER PROGRAM PRODUCT FOR PERFORMING MACHINE LEARNING ON UNSTRUCTURED DOCUMENTS

(71) Applicant: Change Healthcare Holdings, LLC, Nashville, TN (US)

(72) Inventors: Adrian Lam, Emeryville, CA (US); Alex Londeree, San Francisco, CA (US); Thomas Corcoran, San Jose, CA (US); Adam Sullivan, Walnut Creek, CA (US); Nick Giannasi, Truckee, CA (US)

(73) Assignee: CHANGE HEALTHCARE HOLDINGS LLC, Nashville, TN (US)

( * ) Notice: Subject to any disclaimer, the term of this patent is extended or adjusted under 35 U.S.C. 154(b) by 39 days.

(21) Appl. No.: 16/673,412

(22) Filed: Nov. 4, 2019

(51) Int. Cl.
  *G06K 9/00* (2006.01)
  *G06N 3/08* (2006.01)
  *G06K 9/62* (2006.01)

(52) U.S. Cl.
  CPC ..... *G06K 9/00456* (2013.01); *G06K 9/00463* (2013.01); *G06K 9/00469* (2013.01); *G06K 9/6256* (2013.01); *G06N 3/08* (2013.01)

(58) Field of Classification Search
  CPC ........... G06K 9/00456; G06K 9/00463; G06K 9/00469; G06K 9/6256; G06K 9/6296; G06F 16/285; G06F 16/353; G06N 3/08
  USPC ................................................. 382/159, 176
  See application file for complete search history.

(56) References Cited

U.S. PATENT DOCUMENTS

| 6,094,653 A | * | 7/2000 | Li | G06F 16/353 |
| 2016/0314207 A1 | * | 10/2016 | Huang | G06F 16/958 |
| 2018/0246899 A1 | * | 8/2018 | Natchu | G06F 16/93 |

* cited by examiner

*Primary Examiner* — Daniel G Mariam
(74) *Attorney, Agent, or Firm* — Myers Bigel, P.A

(57) ABSTRACT

A method, apparatus and computer program product are provided for classifying pages of a document with a linear regression model, and a deep learning (non-linear) model utilizing a neural network. The classification of each page is determined by determining which of the linearly predicted category or the non-linearly predicted category to use, such as for transmission to an auditor. Pages of medical records generated by concatenating reports from distinct sources are classified according to both models, and embodiments determine which classification should be used. The classifications may be optionally smoothed for continuity. The classifications may be sent to auditors and used to review and audit the medical records.

20 Claims, 7 Drawing Sheets

METHOD, APPARATUS, AND COMPUTER PROGRAM PRODUCT FOR PERFORMING MACHINE LEARNING ON UNSTRUCTURED DOCUMENTS

TECHNOLOGICAL FIELD

Embodiments of the present invention relate generally to natural language processing and, more particularly, to methods, apparatuses, and computer program products for performing machine learning on unstructured documents.

BACKGROUND

Healthcare providers often provide lengthy, unstructured medical records to service providers for the purpose of insurance claim processing, auditing and/or the like. The medical records are often a series of separate documents or reports, concatenated together and provided to the service provider as a single document in a file format such as portable document format (PDF). A broad range of information may be reflected throughout the medical record in various formats and may include information provided by different doctors, medical practitioners, departments, billing software, and/or the like.

The medical records may include hundreds of pages of test results, notes, observations and/or the like, and may further include information compiled from prior visits, measurements taken from nurses or other practitioners, lengthy transcripts from patient visits recorded and/or transcribed, lab results, and/or the like. Documents and information originating from the various sources are concatenated together, sometimes without page breaks, such that a particular page includes the end of one section or report, and begins a different section or report.

The unstructured medical records are often so lengthy, auditors reviewing the medical records may be required to review only certain pages or sections of the medical records at a given time, based on predefined categories. A service provider may therefore categorize individual pages of a medical record as desired by auditors, into categories such as "progress notes," "nursing notes," and "billing." Another category, such as "face sheet," may be used to categorize other pages of medical data that don't necessarily fit into one of the other categories, but are known to be important to an auditor. A face sheet may include discharge summaries, diagnoses, diagnosis-related notes, and/or the like. A "miscellaneous" category may be used to classify additional pages of medical data that also don't fit into another category, but are unimportant to the auditor, or are less important to the auditor than face sheet pages.

The service provider may utilize manual reviewers or "e-coders" to review the large unstructured medical records page-by-page and categorize each page as one of the predefined categories. However, the manual process is subject to human error such as mis-categorization of pages. For example, when reviewing the pages in isolation of other pages, an e-coder may correctly classify pages 1-4 and 6-10 as face sheet, but incorrectly classify page 5 as progress notes. When an auditor retrieves the face sheet pages, the page 5 would be missing from the face sheet series. Not only does the process result in erroneous categorizations, but the manual e-coding requires significant overhead with respect to human review time, such that processing a large quantity of lengthy medical records is inefficient.

BRIEF SUMMARY

Methods, apparatuses, and computer program products are therefore provided for classifying pages of a document into predefined categories. Example embodiments utilize at least two different types of models trained to predict page classifications. The models may be trained with training data including training documents and the confirmed classifications of respective pages therein. For example, example embodiments may utilize a linear model and deep learning model to, independently of one another, predict a page classification of each page of a document. Dependent on the predicted category, and which model generated the prediction, example embodiments determine which prediction to use as the page classification.

An apparatus for classifying pages of a document into predefined categories is provided, the apparatus comprising at least one processor and at least one memory including computer program code, the at least one memory and the computer program code configured to, with the processor, cause the apparatus to at least receive the document comprising a plurality of pages. According to certain embodiments, the document is an unstructured medical record comprising a plurality of sections provided by distinct sources and concatenated together. The at least one memory and the computer program code are further configured to, with the processor, cause the apparatus to with a linear model, process each page of the document to determine a linearly predicted category from the predefined categories, and with a deep learning model, process each page of the document to determine a non-linearly predicted category from the predefined categories. For each page of the document, the at least one memory and the computer program code are further configured to, with the processor, cause the apparatus to determine a classification by determining which of the linearly predicted category or the non-linearly predicted category to use to classify the respective page as one of the predefined categories.

According to certain embodiments, determining which of the linearly predicted category or the non-linearly predicted category to use to classify the respective page as one of the predefined categories comprises accessing a linear list associated with the linear model, the linear list comprising categories identified as frequently reflecting a correct classification when predicted by the linear model using training data. If the linear list comprises the linearly predicted category determining which of the linearly predicted category or the non-linearly predicted category to use to classify the respective page as one of the predefined categories may further include comprises using the linearly predicted category to classify the respective page. If the linear list does not comprise the linearly predicted category determining which of the linearly predicted category or the non-linearly predicted category to use to classify the respective page as one of the predefined categories may further include comprises using the non-linearly predicted category to classify the respective page. In some embodiments, pages of the training data having confirmed categories on the linear list associated with the linear model reflect greater consistency of expected words on the respective page relative to a consistency of expected words on pages of the training data having confirmed categories not on the linear list.

Determining which of the linearly predicted category or the non-linearly predicted category to use to classify the respective page as one of the predefined categories may comprise accessing a linear list associated with the linear model, the linear list comprising categories identified as frequently reflecting a correct classification when predicted by the linear model using training data. If the linear list comprises the linearly predicted category, determining which of the linearly predicted category or the non-linearly predicted category to use includes determining whether a probability of the linearly predicted category being a correct classification satisfies a predetermined threshold. If the linear list comprises the linearly predicted category and the probability satisfies the predetermined threshold, determining which of the linearly predicted category or the non-linearly predicted category to use using the linearly predicted category to classify the respective page. If the linear list does not comprise the linearly predicted category or the probability does not satisfy the predetermined threshold, determining which of the linearly predicted category or the non-linearly predicted category to use comprises using the non-linearly predicted category to classify the respective page.

In certain embodiments, the non-linearly predicted category determined by the deep learning model is determined by processing each page of the document relative to at least one other page of the document.

The at least one memory and the computer program code are further configured to, with the processor, cause the apparatus to smooth the classifications by determining a number of pages preceding a respective page and following the respective page to assess for smoothing, and for each page of the document, assessing the classifications for the number of pages preceding the respective page, if present, and the classifications for the number of pages following the respective page, if present. Smoothing may further include, if the classifications for the number of pages preceding the respective page and the classifications for the number of pages following the respective page are the same and differ from the classification of the respective page, modifying the predicted category of respective page.

A method for classifying pages of a document into predefined categories is provided, the method comprising receiving the document comprising a plurality of pages, and, with a linear model, processing each page of the document to determine a linearly predicted category from the predefined categories. The method may further include, with a deep learning model, processing each page of the document to determine a non-linearly predicted category from the predefined categories. For each page of the document, the method includes determining a classification by determining which of the linearly predicted category or the non-linearly predicted category to use to classify the respective page as one of the predefined categories.

The method may further include smoothing the classifications by determining a number of pages preceding a respective page and following the respective page to assess for smoothing, and for each page of the document, assessing the classifications for the number of pages preceding the respective page, if present, and the classifications for the number of pages following the respective page, if present. The method may further include, if the classifications for the number of pages preceding the respective page and the classifications for the number of pages following the respective page are the same and differ from the classification of the respective page, modifying the predicted category of respective page.

A computer program product for classifying pages of a document into predefined categories is provided, the computer program product comprising at least one non-transitory computer-readable storage medium having computer-executable program code instructions stored therein, the computer-executable program code instructions comprising program code instructions to receive the document comprising a plurality of pages. The computer-executable program code instructions further comprise program code instructions to, with a linear model, process each page of the document to determine a linearly predicted category from the predefined categories, and, with a deep learning model, process each page of the document to determine a non-linearly predicted category from the predefined categories. For each page of the document, the computer-executable program code instructions further comprise program code instructions to determine a classification by determining which of the linearly predicted category or the non-linearly predicted category to use to classify the respective page as one of the predefined categories.

An apparatus is provided with means for classifying pages of a document into predefined categories. The apparatus may include means for receiving the document comprising a plurality of pages, and means for, with a linear model, processing each page of the document to determine a linearly predicted category from the predefined categories. The apparatus may further include means for, with a deep learning model, processing each page of the document to determine a non-linearly predicted category from the predefined categories. For each page of the document, the apparatus may include means for determining a classification by determining which of the linearly predicted category or the non-linearly predicted category to use to classify the respective page as one of the predefined categories.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
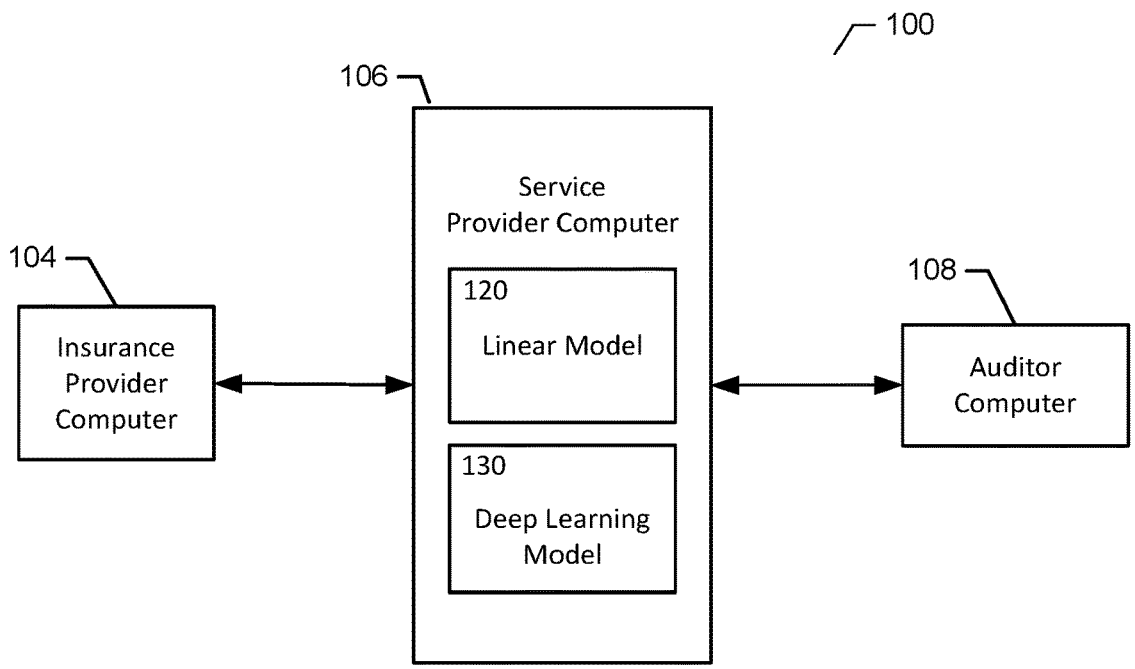
Figure 2:
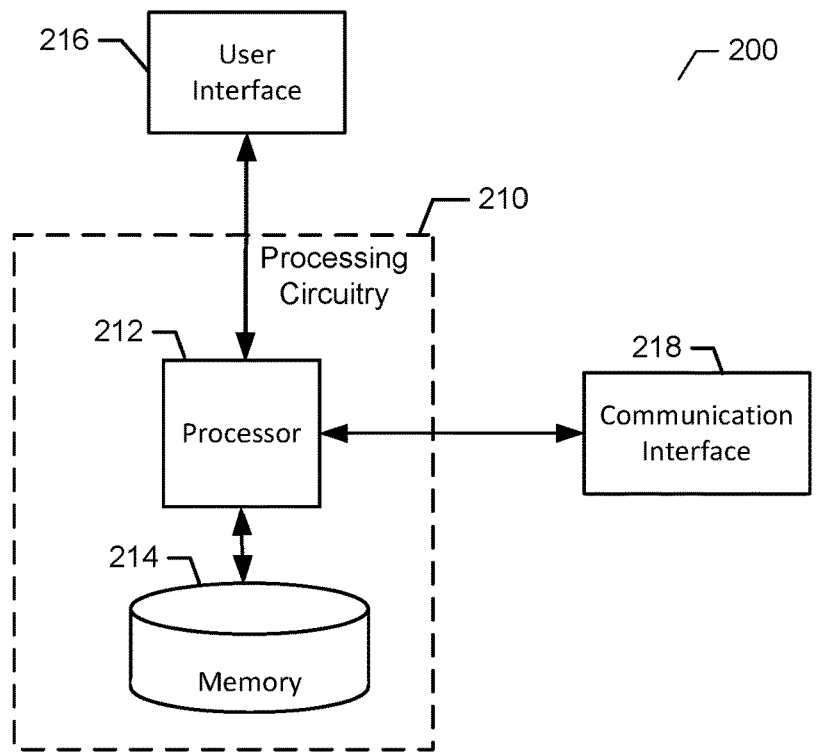

Having thus described embodiments of the invention in general terms, reference will now be made to the accompanying drawings, which are not necessarily drawn to scale, and wherein:

FIG. 1 is an example overview of a system in which certain example embodiments may operate according to the present disclosure;

FIG. 2 is an example apparatus that may implement certain example embodiments described herein; and FIGS. 3, 4A, 4B, and 5-7 are flowcharts of operations that may be performed in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to other computing device, it will be appreciated that the data may be sent directly to the other computing device or may be sent to the other computing device via one or more interlinking computing devices, such as, for example, one or more servers, relays, routers, network access points, and/or the like.

FIG. 1 is an overview of a system that may utilize certain example embodiments described herein. The insurance provider computer 104 may be associated with a healthcare insurance provider, health insurance claim processor, and/or the like, and may be configured to transmit healthcare records to the service provider computer 106. According to some embodiments, the insurance provider computer 104 may not be required to provide structured electronic healthcare record (EHR) data to the service provider computer 106, and may instead transmit unstructured medical records to the service provider computer 106. In this regard, the document received by the service provider 106 may comprise different sections of information, but the sections are unknown to the service provider 106 upon receipt. The various sections may be predicted, by classifying the pages, according to example embodiments described herein.

The insurance provider computer 104 may therefore be any processor-driven device that facilitates the generation of the documents, such as unstructured medical records, and/or directs the communication thereof to the service provider computer 106. The service provider computer 106 may include, but is not limited to, a processor-driven device configured to receive the documents, predict categories of pages of the document using various models, determine which predicted classification to use, and/or transmit the determined classifications to an auditor computer 108 according to example embodiments. In this regard, the service provider computer 106 may perform optical character recognition (OCR) on the unstructured documents received from the insurance provider computer to convert the documents to computer-readable electronic text, and may further utilize various models, such as a linear model 120 and a deep learning model 130, to predict page classifications.

The linear model 120 may comprise computer-readable instructions configured to predict page classifications using a linear regression function. The linear model 120 may be trained with training data including documents and page classifications provided by an e-coder or other human reviewer. The training data may include real data provided by the insurance provider computer 104 and/or mocked data. The training of linear regression models is performed such that the linear model 120 plots different features relative to their labels (e.g., confirmed page classifications), and determines the relative significance of various features present on a page in correctly classifying the page. For example, certain predefined categories may be characterized by certain keywords that appear frequently on pages of the category. For example, keywords or phrases that often appear on billing pages may include, "Amount Due," "Balance," "Billing Date," "Invoice," and/or the like. The linear model 120 may therefore be trained to recognize the words, combinations of words, positions of words, and/or frequencies of words that consistently indicate a page should be classified as a particular predefined category, such as billing. In this regard, the linear model 120 may be reliable or accurate in predicting page classifications for categories that reflect greater consistency of expected words on a page, relative to a consistency of expected words on pages belonging to categories for which the deep learning model 130 may be considered more reliable or accurate, as described in further detail below.

The linear model 120 may be trained using a window size of 1, meaning that individual pages may be processed independently of others. However, in some examples a larger window size, such as 3, may be used in analyzing the pages and training the model. For example, when the window size is 3, a page before and after the subject page may be processed by the linear model 120 during classification of a subject page. It will be appreciated that any window size may be used. In this regard, information from other surrounding pages may be used by the linear model 120 in classifying a page.

Whereas the linear model 120 may be trained to accurately classify pages into categories reflecting a relative consistency of expected words and/or information on the page (such as a billing category), the linear model 120 may be less accurate in classifying more complex pages or sections of documents, having a relatively lower consistency of expected words on a page. As one example, the face sheet category may have little consistency of words across different documents. A face sheet in one document may include a discharge summary for a patient hospitalized for emergency bypass surgery, and a face sheet in another document may include a discharge summary for a patient who visited a hospital and was quickly discharged for having false labor pains. The two discharge summaries may have fewer similarities between each other when compared to billing pages taken from various documents, but both discharge summaries should be classified as face sheets due to the significance of the information to an auditor.

A human reviewer may be able to glance over or scan a page of a discharge summary or other document that should be classified as a face sheet, and usually discern that the page contains information pertinent to a medical record audit. For example, discharge summaries and other report types that should be classified as a face sheet may include written descriptions of diagnoses, a summary of treatment, patient condition at discharge, and/or the like. A page classified as "miscellaneous," (not fitting into one of the other predefined categories, but not as important to the auditor as face sheets), may include information regarding medical education intended for the patient's review, such as based on a particular diagnosis, blank pages, disclaimer forms, and/or the like. The information of miscellaneous pages reflects some characteristics of the face sheet in that there is little consistency across different miscellaneous pages of different documents, but the information is less important to an auditor and does not need to be classified as a face sheet. The human reviewer may also usually distinguish the important information on a face sheet from the less important information of a miscellaneous page, but the linear model 120 may not be able to consistently recognize the significance of information on the pages to accurately classify face sheets, miscellaneous pages, and other relatively complex content, or inconsistent content when compared to pages of other documents belonging to the same category.

To better replicate the human factor needed to classify pages that are more complex than those often classified correctly by the linear model 120, the deep learning model 130 may utilize a neural network to model the content of the pages and to be trained using training data. The deep learning model 130 may utilize existing frameworks to initialize nodes of the neural network (e.g., a matrix-representation of the content), and train the deep learning model 130 with the training documents and labels (e.g., confirmed page classifications). The deep learning model 130 may utilize back propagation and perform a series of iterations to adjust its parameters and reconfigure the representations of the content, placing greater weight on those features that are strong indicators of the confirmed classifications provided by the training data, and removing or reducing the features that are not as useful in predicting the correct classifications.

The deep learning model 130 may be trained with training data including documents and page classifications provided by an e-coder or other human reviewer, which may be the same or different data used to train the linear model 120. According to some embodiments, the deep learning model 130 may be configured to process sub-sequences of pages of the document to use in its analysis to train the model to classify a page and/or to classify a page at runtime. For example, the deep learning model 130 may utilize sub-sequences having a window size of 3, to analyze 1 page before and 1 page after a subject page. Any window size may be used according to example embodiments during training and deployment of the deep learning model 130.

The deep learning model 130 is particularly useful in learning relationships between the various words occurring on a page, the position and size of those words relative to other words, and the patterns thereof that are strong indicators of a particular category. In this regard, using a window size of 3 pages or more may improve the accuracy of the deep learning model 130 in classifying the more complex pages by analyzing the content before and after the subject page.

As described above, the linear model 120 and deep learning model 130 may both be useful for classifying certain types of pages. The service provider computer 106 may utilize predictions from both models, as described in further detail below, to determine which of the predictions should be used for the classification of a particular page, and optionally transmit those page classifications to the auditor computer 108. It will be appreciated that although FIG. 1 depicts the linear model 120 and deep learning model 130 as components of the service provider computer 106, in certain example embodiments, the linear model 120 and deep learning model 130 may be implemented separately from the service provider computer 106, and may communicate predicted page classifications to the service provider computer 106.

The auditor computer 108 may be any recipient computer of the page classifications and/or document comprising individual page classifications, such as that of an insurance claim auditor and/or the like. For example, the auditor computer 108 may be preconfigured to receive documents from the service provider computer 106, using predefined and agreed upon categories for the page classifications. Different auditor computers 108 may have different sets of predefined categories in which the pages are categorized. The service provider may therefore provide such classifications based on restrictions or requirements of the auditor computer 108 and/or applications thereof used by auditors for review of the documents. According to some embodiments, the auditor computer 108 may be under the control or ownership of a third party, such as one with an agreement with the service provider. As another example, the auditor computer 108 may be controlled and operated by the service provider.

Having now introduced an example system in which certain example embodiments may operate, FIG. 2 provides an example apparatus 200 configured for implementing an insurance provider computer 104, service provider computer 106, linear model 120, deep learning model 130, and/or auditor computer 108, according to example embodiments.

Apparatus 200 may be a computer device(s) that at least partially or wholly embodies any of the insurance provider computer 104, service provider computer 106, linear model 120, deep learning model 130, and/or auditor computer 108. Apparatus 200 may therefore implement any of the insurance provider computer 104, service provider computer 106, linear model 120, deep learning model 130, and/or auditor computer 108, in accordance with some example embodiments, or may be implemented as a distributed system that includes any of the insurance provider computer 104, service provider computer 106, linear model 120, deep learning model 130, auditor computer 108, and/or associated network(s).

It should be noted that the components, devices, and elements illustrated in and described with respect to FIG. 2 may not be mandatory and thus some may be omitted in certain embodiments. For example, FIG. 2 illustrates a user interface 216, as described in more detail below, which may be optional in any of the insurance provider computer 104, service provider computer 106, linear model 120, and/or deep learning model 130. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of apparatus 200 in accordance with various example embodiments. The processing circuitry 210 may be configured to perform data processing, application execution, and/or other processing and management services according to one or more example embodiments. In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210, such as that included in any of the insurance provider computer 104, service provider computer 106, linear model 120, deep learning model 130, auditor computer 108, and/or apparatus 200 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as insurance provider computer 104, service provider computer 106, linear model 120, deep learning model 130, auditor computer 108, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments. For example, when apparatus 200 is implemented as linear model 120 and/or deep learning model 130, memory 214 may be configured to store the models and to store computer program instructions for operating on the respective models. When apparatus 200 is implemented as service provider computer 106, memory 214 may be configured to store computer program code for interfacing with both models, and for determining which classifications to use, as described herein according to example embodiments.

The memory 214 may be further configured to buffer input data for processing by the processor 212. Additionally or alternatively, the memory 214 may be configured to store instructions for execution by the processor 212. In some embodiments, the memory 214 may include one or more databases, such as database 102, that may store a variety of files, contents, or data sets, such as but not limited to training documents and their confirmed page classifications. The memory 214 may be modified as documents are processed, to store updated data representations of the documents, predicted page classifications and/or the like. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a display, a touch screen display, a microphone, a speaker, and/or other input/output mechanisms. As such, in embodiments in which apparatus 200 is implemented as the auditor computer 108, the user interface may provide sections of a document, or subsets of pages of a document for viewing by the auditor, organized or filterable by their predicted page classifications. In some example embodiments, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. Accordingly, the communication interface 218 may, for example, include supporting hardware and/or software for enabling wireless and/or wireline communications via cable, digital subscriber line (DSL), universal serial bus (USB), Ethernet, or other methods.

The network, such as the network in which the system of FIG. 1 or components thereof or components described herein may operate, (e.g., insurance provider computer 104, service provider computer 106, linear model 120, deep learning model 130, auditor computer 108 and/or apparatus 200, and/or the like) may include a local area network, the Internet, any other form of a network, or in any combination thereof, including proprietary private and semi-private networks and public networks. The network may comprise a wired network and/or a wireless network (e.g., a cellular network, wireless local area network, wireless wide area network, some combination thereof, and/or the like).

Figure 3:
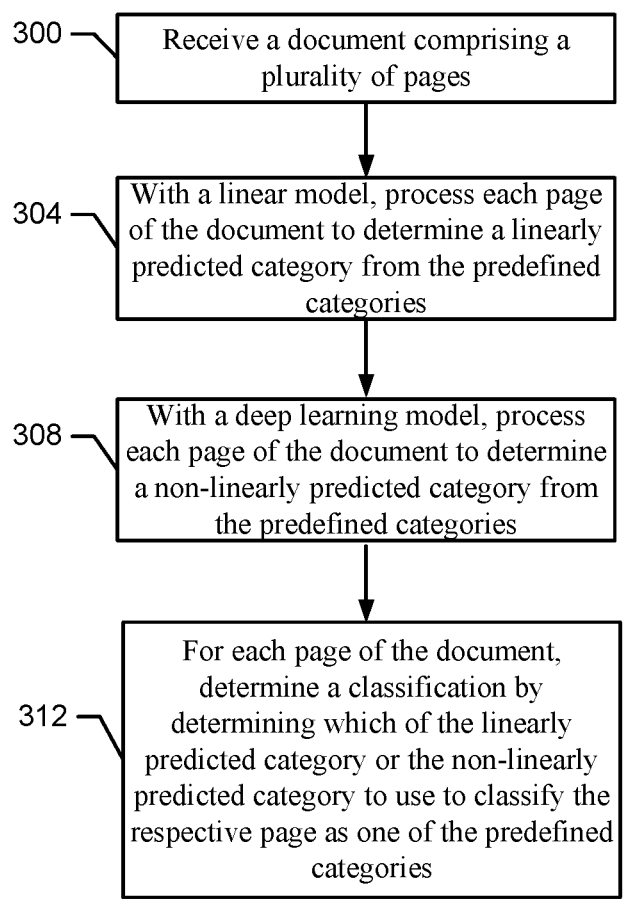

Having now described an example apparatus for implementing example embodiments, FIG. 3 is a flowchart illustrating example operations of an apparatus 200, according to some example embodiments. The operations of FIG. 3 may be performed by apparatus 200, such as with the service provider computer 106 and/or the like.

As shown in operation 300, apparatus 200 may include means, such as such as service provider computer 106, processor 212, memory 214, communication interface 218 and/or the like, for receiving a document comprising a plurality of pages. The document may be an unstructured medical record received from the insurance provider computer 104. The document may be received in a runtime environment in which the page classifications are unknown to the service provider computer 106 when the document is received by the service provider computer 106.

In operation 304, apparatus 200 may include means, such as such as service provider computer 106, linear model 120, processor 212, memory 214, and/or the like, for processing each page of the document to determine a linearly predicted category from the predefined categories. In this regard, the service provider computer 106 may perform page classifications of all the pages in the document using the linear model 120. As described above, the pages (having already been converted by OCR) may be input to a trained linear regression model. According to certain embodiments, the linear model 120 may output a probability, such as on a scale of 0 to 1, or any other range, or a percentage probability for each predefined category, indicating the probability that a page belongs to the respective category. According to some embodiments, if the range of probabilities are 0 to 1, the sum of the predicted probabilities may be 1. The category having the highest associated probability may therefore be identified as the linearly predicted category. The linear model 120 may then output or generate a linearly predicated category from the predefined categories, for each page in the document.

In operation 308, apparatus 200 may include means, such as such as service provider computer 106, deep learning model 130, processor 212, memory 214, and/or the like, for processing each page of the document to determine a non-linearly predicted category from the predefined categories. In this regard, the non-linearly predicted category may be categories predicted using models other than those utilizing linear regression. The deep learning model 130 may therefore determine the non-linearly predicted category using a trained neural network as described above. According to certain embodiments, the deep learning model 130 may output a probability, such as on a scale of 0 to 1, for each predefined category, identifying the probability that a page belongs to the respective category. The category having the highest associated probability may therefore be identified as the non-linearly predicted category.

As shown by operation 312 apparatus 200 may include means, such as such as service provider computer 106, processor 212, memory 214, and/or the like for determining, for a particular page of the document, a classification by determining which of the linearly predicted category or the non-linearly predicted category to use to classify the respective page as one of the predefined categories. Both models are used to predict separate classifications for each page, and example embodiments determine which of the predictions should be used to provide to the auditor computer 108. Further detail regarding how the determination is made is described in further detail below.

Figure 4A:
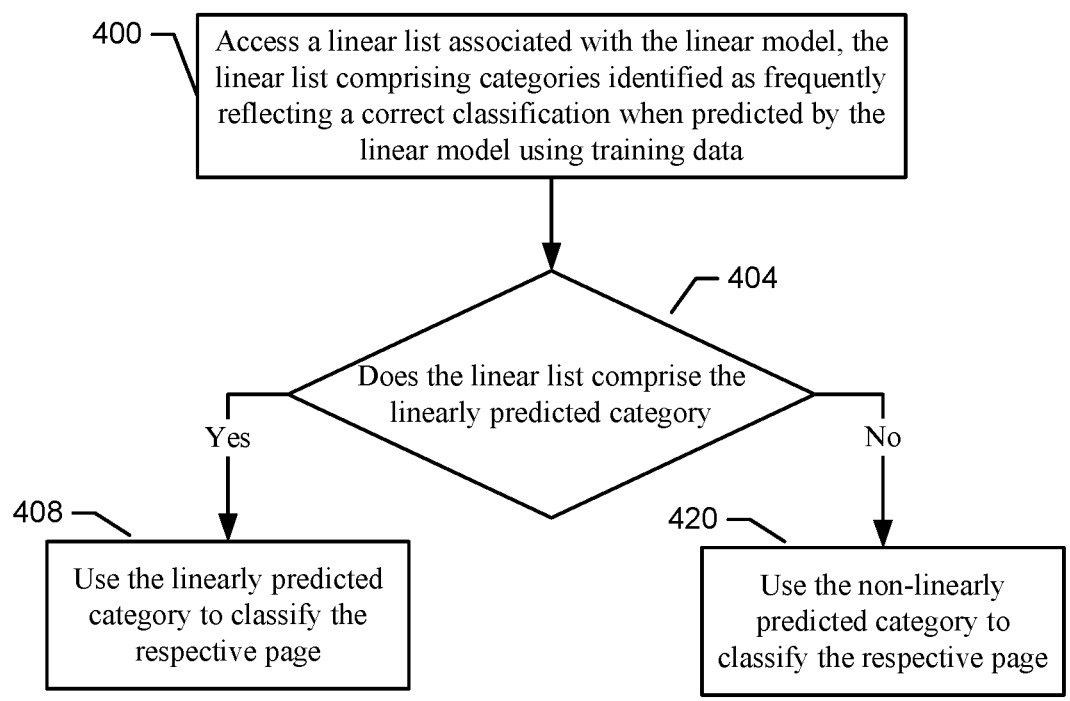

FIG. 4A is a flowchart of operations that may performed according to example embodiments to determine which of the linearly predicted category or the non-linearly predicted category to use to classify the respective page as one of the predefined categories. In operation 400, apparatus 200 may include means, such as such as service provider computer 106, processor 212, memory 214, and/or the like for accessing a linear list associated with the linear model, the linear list comprising categories identified as frequently reflecting a correct classification when predicted by the linear model using training data. Categories on the linear list may include those categories that have consistencies in the expected words on the page, even across different documents. In this regard, the categories on the linear list may be considered to have associated pages that are less complex than those on the deep learning list, described below. Said differently, pages of training data having confirmed categories on the linear list associated with the linear model may reflect greater consistency of expected words on the respective page relative to a consistency of expected words on pages of the training data having confirmed categories not on the linear list.

As another example, categories on the linear list may include those that often have fewer subsequences of pages, and/or fewer overall pages relative to the complete document. For example, billing statements may often occur on 1 page of every 1000 pages, and may therefore be processed and accurately identified more often by the linear model 120 than the deep learning model 130.

Categories on the linear list may additionally or alternately have more homogeneous and/or consistent training data when compared to the training data associated with categories on the deep learning list. The linear model may therefore perform better in classifying documents from categories on the linear list, in comparison to the deep learning model because the linear model is better than the deep learning model at learning the simpler patterns of page categories on the linear list, and/or is better than the deep learning model at learning from consistent patterns amongst the categories on the linear list.

The linear list may be stored on memory 214. By way of non-limiting example, a linear list may include categories such as:

Billing
Specific types of billing statements such as UB 92 and MILL
PRM
ADDITIONAL
XTRA (e.g., blank pages)
MED MISC
Orders (e.g., doctor's orders)
Medication Administration Records
Nursing Notes In contrast to the linear list, a deep learning list may comprise categories identified as frequently reflecting a correct classification when predicted by the deep learning model. As such, the deep learning list may include categories that have associated pages that are more complex, or reflect lower consistency of words on the pages, than categories on the linear list. Additionally, or alternatively, the deep learning list may include categories that often have longer subsequences and/or a larger number of overall pages relative to a complete document (e.g., longer subsequences and/or larger number of pages in comparison to categories on the linear list). This may be due to the deep learning model 130 being configured, at least according to certain example embodiments, to more accurately identify patterns from subsequences of pages, as opposed to single pages in isolation (e.g., single page billing statements).

The deep learning list may include categories such as:
Face sheet
Miscellaneous
Progress notes Continuing to operation 404, apparatus 200 may include means, such as such as service provider computer 106, processor 212, memory 214, and/or the like for determining whether the linear list comprises the linearly predicted category. If so, at operation 408, apparatus 200 may include means, such as such as service provider computer 106, processor 212, memory 214, and/or the like, for using the linearly predicted category to classify the respective page. Because the linear model 120 is found to accurately predict page classifications for certain categories such as billing, and others on the linear list, if the condition 404 is met, in some embodiments, no further action may be needed, and the non-linearly predicted category may be ignored or not used.

Continuing to operation 420, if the linearly predicted category is not on the linear list, apparatus 200 may include means, such as such as service provider computer 106, processor 212, memory 214, and/or the like for using the non-linearly predicted category to classify the respective page. In this regard, example embodiments determine the category predicted by the linear model may not be accurate, and to use the category predicted by the deep learning model 130.

Figure 4B:
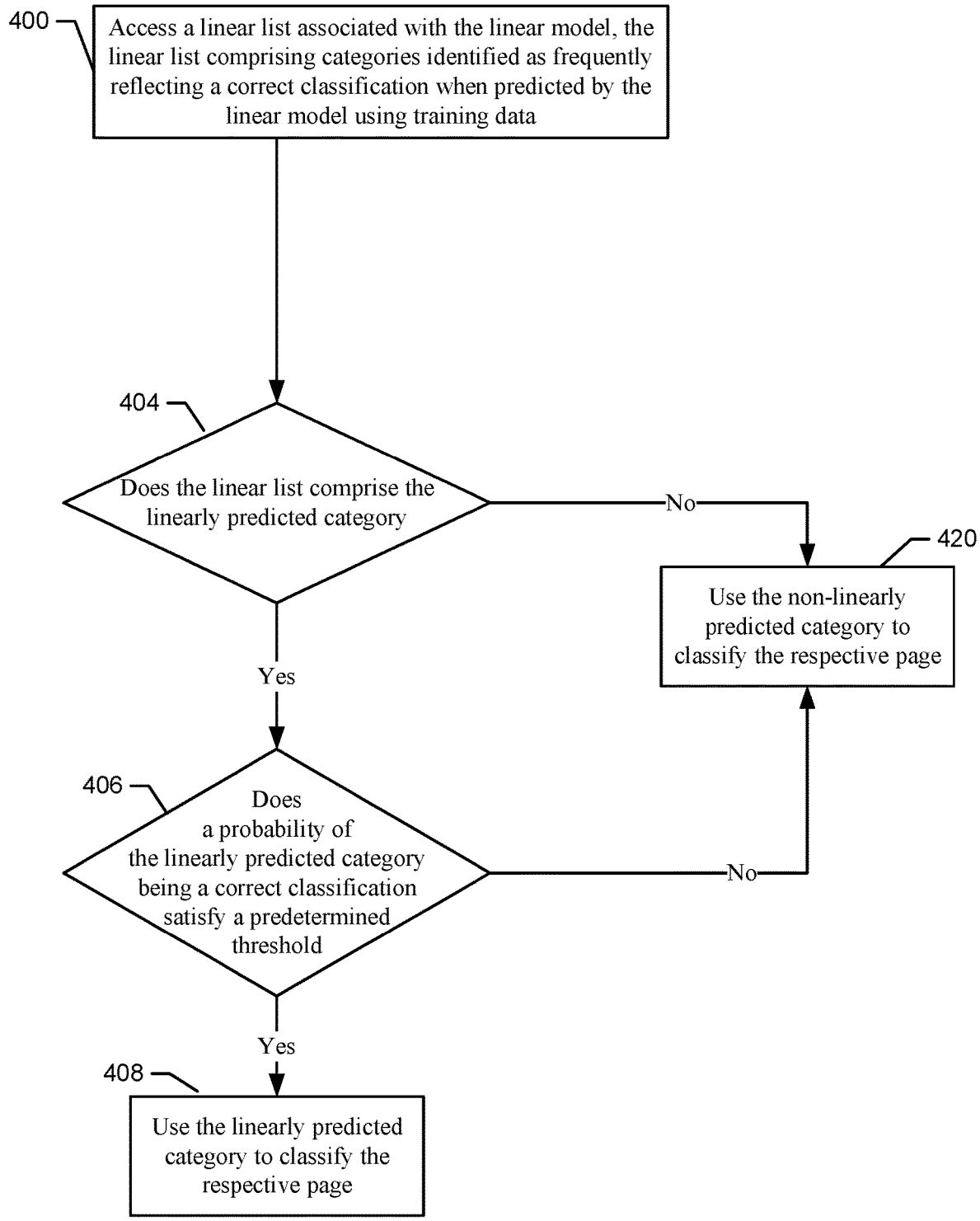

FIG. 4B is a flowchart of operations that may performed according to example embodiments to determine which of the linearly predicted category or the non-linearly predicted category to use to classify the respective page as one of the predefined categories. The flowchart partially replicates the flowchart of FIG. 4A, but includes an optional operation 406 performed if the linearly predicted category is on the linear list. In operation 406, apparatus 200 may include means, such as such as service provider computer 106, processor 212, memory 214, and/or the like for determining whether a probability of the linearly predicted category being a correct classification satisfies a predetermined threshold. The probability may be provided by the linear model 120, and may include a probability between 0 and 1, or any other range, or a percentage probability. A predetermined threshold may be predefined or configured. For example, a predetermined threshold may be 0.5 or 50%.

Determining whether the probability of the linearly predicted category being a correct classification satisfies a predetermined threshold may include comparing the probability to a predetermined threshold and determining whether the probability has a predefined relationship with the threshold probability (e.g., greater than, or greater than or equal to).

If the probability satisfies the predetermined threshold, apparatus 200 may include means for using the linearly predicted category to classify the respective page, as described above with respect to operation 408. If the probability does not satisfy the predetermined threshold, apparatus 200 may include means for using the non-linearly predicted category to classify the respective page, as described above with respect to operation 420.

Figure 5:
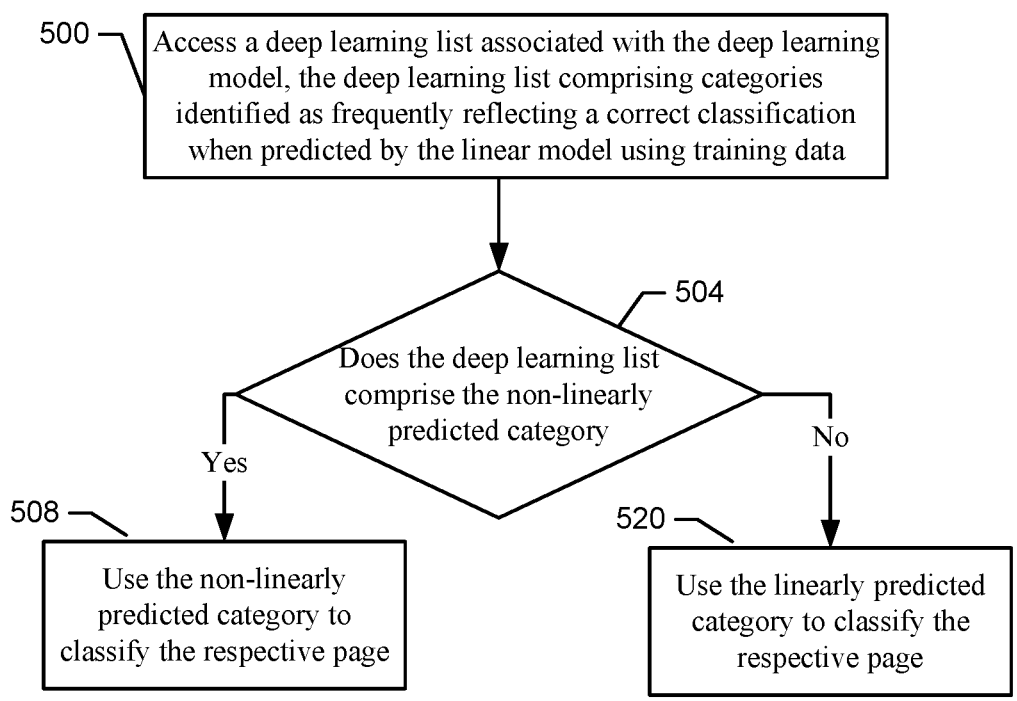

It will be appreciated that the operations of FIGS. 4A and/or 4B may be sufficient for determining which of the linearly predicted category or the non-linearly predicted category to use to classify the respective page as one of the predefined categories, but that additionally or alternatively, the operations of FIG. 5 may be performed to determine which of the linearly predicted category or the non-linearly predicted category to use. FIGS. 4A and 4B illustrate operations of certain example embodiments in which the linearly predicted category takes precedence over the non-linearly predicted category when the linearly predicted category is determined as reliable or likely accurate. In contrast, FIG. 5 illustrates operations of certain example embodiments in which the non-linearly predicted category takes precedence over the linearly predicted category when the non-linearly predicted category is determined as reliable or likely accurate.

FIG. 5 is a flowchart of operations that may performed according to example embodiments to determine which of the linearly predicted category or the non-linearly predicted category to use to classify the respective page as one of the predefined categories. In operation 500, apparatus 200 may include means, such as such as service provider computer 106, processor 212, memory 214, and/or the like for accessing a deep learning list associated with the deep learning model, the deep learning list comprising categories identified as frequently reflecting a correct classification when predicted by the deep learning model using training data.

Continuing to operation 504, apparatus 200 may include means, such as such as service provider computer 106, processor 212, memory 214, and/or the like for determining whether the deep learning list comprises the non-linearly predicted category. If so, at operation 408, apparatus 200 may include means, such as such as service provider computer 106, processor 212, memory 214, and/or the like for using the non-linearly predicted category to classify the respective page. Because the deep learning model 130 is found to accurately predict page classifications for certain categories such as face sheet, miscellaneous, progress notes, and/or the like, if the condition 504 is met, in some embodiments, no further action may be needed, and the linearly predicted category may be ignored or not used.

Continuing to operation 520, if the non-linearly predicted category is not on the deep learning list, apparatus 200 may include means, such as such as service provider computer 106, processor 212, memory 214, and/or the like for using the linearly predicted category to classify the respective page. In this regard, example embodiments determine the category predicted by the deep learning model may not be accurate, and to use the category predicted by the linear model 120.

According to certain example embodiments, although not illustrated in FIG. 5, example embodiments may optionally determine, prior to operation 508, whether a probability that the non-linearly predicted category is a correct classification satisfies a predetermined threshold. The comparison to a predetermined threshold may be similar to that of operation 406. If the threshold is satisfied, at operation 508, the non-linearly predicted category is used. If the threshold is not satisfied, at operation 520, the linearly predicted category is used.

Figure 6:
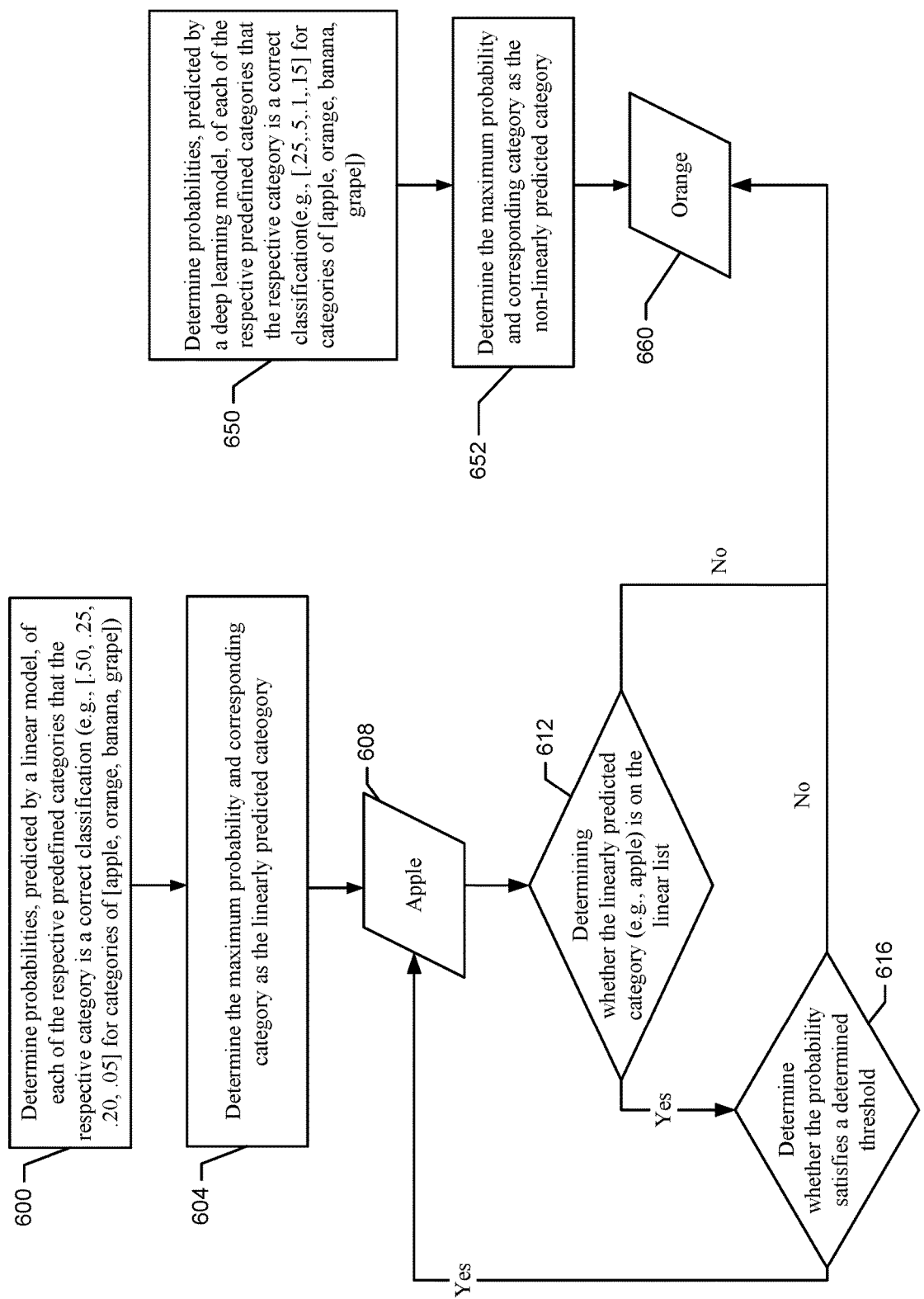

FIG. 6 is a flowchart of operations according to example embodiments. The flowchart illustrates an example scenario in which the linearly predicted category is checked to determine whether the linearly predicted category should be used to classify the respective page, as illustrated in FIG. 4B.

As shown in operation 600, apparatus 200 may include means, such as such as service provider computer 106, processor 212, memory 214, linear model 120, and/or the like for determining probabilities, predicted by a linear model, such as linear model 120 of each of the respective predefined categories that the respective category is a correct classification. According to an example, the linear model 120 may return example probabilities of [0.50, 0.25, 0.20, 0.05] for the respective predefined categories [apple, orange, banana, grape]. In operation 604, apparatus 200 may include means, such as such as service provider computer 106, processor 212, memory 214, and/or the like for determining the maximum probability and corresponding category. According to the example, and as illustrated in block 608, the category with the highest probability of 0.50 is apple, and is therefore the linearly predicted category.

As shown in operation 650, apparatus 200 may include means, such as such as service provider computer 106, processor 212, memory 214, and/or the like for determining probabilities, predicted by a deep learning model, such as deep learning model 130, of each of the respective predefined categories that the respective category is a correct classification. According to the example, the linear model 120 may return example probabilities of [0.25,0.5,0.1,0.15]. In operation 652 apparatus 200 may include means, such as such as service provider computer 106, processor 212, memory 214, and/or the like for determining the maximum probability and corresponding category predicted by the deep learning model. According to the example, and as illustrated in block 660, the category with the highest probability of 0.50 is orange, and is therefore the non-linearly predicted category.

In operation 612, apparatus 200 may include means, such as such as service provider computer 106, processor 212, memory 214, and/or the like for determining whether the linearly predicted category is on the linear list. If so, in operation 616, apparatus 200 may include means, such as such as service provider computer 106, processor 212, memory 214, and/or the like for determining whether the probability satisfies a determined threshold, and if so, as shown at block 608, example embodiments may use the linearly predicted category (Apple) as the page classification.

If the linearly predicted category is not on the linear list, or if the corresponding probability does not satisfy the predetermined threshold, the non-linearly predicted category (e.g., orange, block 660) may be used as the page classification.

Having performed the operations of FIGS. 4A, 4B and/or 6, example embodiments determine classifications that may be used to provide to the auditor computer 108. It will be appreciated that other processes for determining which of the linearly or non-linearly predicted category to use may be employed by example embodiments. For example, apparatus 200 may be configured with rules, such as a rule indicating that whichever model produces the highest probability, the respective prediction is used as the classification. The probability may be considered a confidence level generated from the signal strength of either model when classifying a page. As another example, a separate model could be trained and utilized to predict which of the linearly predicted or non-linearly predicted category to use.

Figure 7:
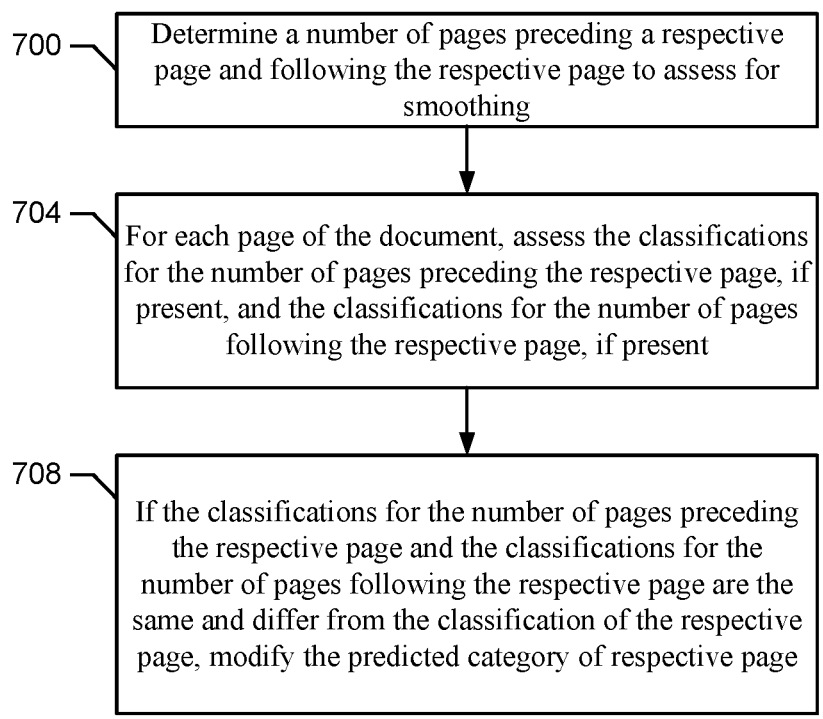

In any event, according to some embodiments, the selected predictions may be the final predictions used (e.g., transmitted to the auditor computer 108), but in some examples, the predictions may be smoothed as described with respect to FIG. 7 below. The optional smoothing process may promote continuity of pages in a subsequence as belonging to the same category, and may make modifications or corrections to page classifications predicted as described above, based on an otherwise continuous subsequence of pages having the same predicted classification.

As shown in operation 600, apparatus 200 may include means, such as such as service provider computer 106, processor 212, memory 214, and/or the like for determining a number of pages preceding a respective page and following the respective page to assess for smoothing. In this regard, example embodiments may determine to assess 2 pages on either side of a particular page (e.g., resulting in smoothing of 5-page sequences). Any number of pages may be assessed for the purposes of smoothing, and it will be further appreciated that according to some example embodiments, a first number of pages preceding a subject page be assessed, and a second or different number of pages following the subject page be assessed. For example, 3 pages prior to a subject page may be assessed for smoothing, and 1 page following the subject page may be assessed for smoothing. Any variation of numbers of pages may be utilized according to example embodiments.

In operation 604, for each page of the document, apparatus 200 may include means, such as such as service provider computer 106, processor 212, memory 214, and/or the like for assessing the classifications for the number of pages preceding the respective page, if present, and the classifications for the number of pages following the respective page, if present. The classifications initially predicted with regard to the operations of FIGS. 3, 4 and 5 may therefore be assessed for the purpose of smoothing.

In operation 608, if the classifications for the number of pages preceding the respective page and the classifications for the number of pages following the respective page are the same and differ from the classification of the respective page, apparatus 200 may include means, such as such as service provider computer 106, processor 212, memory 214, and/or the like for modifying the predicted category of the respective page. In this regard, if the number of pages to assess for smoothing is 2, and pages 1-2, and 4-5 of a subsequence are classified as "face sheet," but page 3 is classified as "progress notes," the determined classification of page 3 may be modified or changed to "face sheet." As another example, example embodiments may assess 3 pages proceeding a certain page, but only 1 page following the subject page, and smooth the classifications accordingly.

The operations of FIG. 6 further improve the accuracy of example embodiments, particularly in scenarios where a long subsequence or section includes a page misclassified by example embodiments due to uncharacteristic words or patterns thereof.

The example embodiments provide a practical application of integrating both a linear regression model (e.g., linear model 120) and deep learning model (e.g., deep learning model 130) implemented using a neural network, to classify pages of a document. Medical records in particular are often generated by concatenating numerous reports or sections from distinct sources, some of which have consistent, and predictable words and formats, while other reports or sections have inconsistent and unpredictable words and formats. The linear model 120 may be more accurate in classifying pages associated with categories having consistent and predictable words (relative to the deep learning model 130), and the deep learning model 130 may be more accurate in classifying pages associated with categories having inconsistent and unpredictable words (relative to the linear model 120). As such, example embodiments balance the benefits of different types of models as described herein, and optionally smooth the predicted classifications to provide an improved method, apparatus, computer program product and system for classifying pages of a document.

Implementing the page classifications using both the linear model 120 and deep learning model 130, and determining which of the linearly predicted or non-linearly predicted category to use, additionally enables example embodiments to provide the classifications in real-time or near real-time to the auditor computer 108 relative to the receipt of the document (e.g., medical record) from the insurance provider computer 104, while reducing or eliminating time otherwise needed to manually review pages (or classifications separately predicted by each of the models), thereby integrating the use of the models into the practical applications of automatically determining which prediction from different models to select as a classification, and the practical application of automated classification of pages of medical records.

Example embodiments therefore provide a solution to a technical problem introduced by prior attempts to automate page classification using computer-based models. Using an individual model alone, such as the linear model 120 or deep learning model 130, does not yield as accurate results when compared to the results of example embodiments which utilize both models and determine a page classification based on a prediction and the particular model which made the prediction. Generating more accurate page classifications may therefore reduce the computational resources, such as memory and processing resources, that may otherwise be expended on storing and processing incorrect page classifications, and managing work tickets needed to resolve the incorrect page classifications when reported by auditors or other users.

Moreover, it will be appreciated that the concepts disclosed herein may be implemented using any types of natural language and/or machine learning models configured for classifying data such as pages of a document. For example, as various types of models are implemented, the models may be identified as more accurate in classifying data or pages having specific characteristics, in comparison to other models. In this regard, various models may be utilized according to example embodiments, and respective lists may be maintained listing the types of classifications that are accurately generated by the particular model. Accordingly, embodiments disclosed herein may be modified to incorporate any number of and types of natural language and/or machine learning models.

It will be appreciated that the figures of the disclosure are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

FIGS. 3, 4A, 4B, 5, 6 and 7 illustrate operations of a method, apparatus, and computer program product according to some example embodiments. It will be understood that each operation of the flowchart or diagrams, and combinations of operations in the flowchart or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, apparatus 200) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, apparatus 200 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for classifying pages of a document into predefined categories, the apparatus comprising at least one processor and at least one memory including computer program code, the at least one memory and the computer program code configured to, with the processor, cause the apparatus to at least:
   receive the document comprising a plurality of pages;
   with a linear model, process each page of the document to determine a linearly predicted category from the predefined categories;
   with a deep learning model, process each page of the document to determine a non-linearly predicted category from the predefined categories; and
   for each page of the document, determine a classification by determining which of the linearly predicted category or the non-linearly predicted category to use to classify the respective page as one of the predefined categories.

2. The apparatus of claim 1, wherein determining which of the linearly predicted category or the non-linearly predicted category to use to classify the respective page as one of the predefined categories comprises:
   accessing a linear list associated with the linear model, the linear list comprising categories identified as frequently reflecting a correct classification when predicted by the linear model using training data;
   if the linear list comprises the linearly predicted category, using the linearly predicted category to classify the respective page; and
   if the linear list does not comprise the linearly predicted category, using the non-linearly predicted category to classify the respective page.

3. The apparatus of claim 2, wherein pages of the training data having confirmed categories on the linear list associated with the linear model reflect greater consistency of expected words on the respective page relative to a consistency of expected words on pages of the training data having confirmed categories not on the linear list.

4. The apparatus of claim 1, wherein determining which of the linearly predicted category or the non-linearly predicted category to use to classify the respective page as one of the predefined categories comprises:

accessing a linear list associated with the linear model, the linear list comprising categories identified as frequently reflecting a correct classification when predicted by the linear model using training data;

if the linear list comprises the linearly predicted category, determining whether a probability of the linearly predicted category being a correct classification satisfies a predetermined threshold;

if the linear list comprises the linearly predicted category and the probability satisfies the predetermined threshold, using the linearly predicted category to classify the respective page; and if the linear list does not comprise the linearly predicted category or the probability does not satisfy the predetermined threshold, using the non-linearly predicted category to classify the respective page.

5. The apparatus of claim 1, wherein the non-linearly predicted category determined by the deep learning model is determined by processing each page of the document relative to at least one other page of the document.

6. The apparatus of claim 1, wherein the at least one memory and the computer program code are further configured to, with the processor, cause the apparatus to:
smooth the classifications by:
determining a number of pages preceding a respective page and following the respective page to assess for smoothing;
for each page of the document, assessing the classifications for the number of pages preceding the respective page, if present, and the classifications for the number of pages following the respective page, if present; and
if the classifications for the number of pages preceding the respective page and the classifications for the number of pages following the respective page are the same and differ from the classification of the respective page, modifying the predicted category of respective page.

7. The apparatus of claim 1, wherein the document is an unstructured medical record comprising a plurality of sections provided by distinct sources and concatenated together.

8. A method for classifying pages of a document into predefined categories, the method comprising:
receiving the document comprising a plurality of pages;
with a linear model, processing each page of the document to determine a linearly predicted category from the predefined categories;
with a deep learning model, processing each page of the document to determine a non-linearly predicted category from the predefined categories; and
for each page of the document, determining a classification by determining which of the linearly predicted category or the non-linearly predicted category to use to classify the respective page as one of the predefined categories.

9. The method of claim 8, wherein determining which of the linearly predicted category or the non-linearly predicted category to use to classify the respective page as one of the predefined categories comprises:
accessing a linear list associated with the linear model, the linear list comprising categories identified as frequently reflecting a correct classification when predicted by the linear model using training data;
if the linear list comprises the linearly predicted category, using the linearly predicted category to classify the respective page; and if the linear list does not comprise the linearly predicted category, using the non-linearly predicted category to classify the respective page.

10. The method of claim 9, wherein pages of the training data having confirmed categories on the linear list associated with the linear model reflect greater consistency of expected words on the respective page relative to a consistency of expected words on pages of the training data having confirmed categories not on the linear list.

11. The method of claim 8, wherein determining which of the linearly predicted category or the non-linearly predicted category to use to classify the respective page as one of the predefined categories comprises:
accessing a linear list associated with the linear model, the linear list comprising categories identified as frequently reflecting a correct classification when predicted by the linear model using training data;
if the linear list comprises the linearly predicted category, determining whether a probability of the linearly predicted category being a correct classification satisfies a predetermined threshold;
if the linear list comprises the linearly predicted category and the probability satisfies the predetermined threshold, using the linearly predicted category to classify the respective page; and
if the linear list does not comprise the linearly predicted category or the probability does not satisfy the predetermined threshold, using the non-linearly predicted category to classify the respective page.

12. The method of claim 8, wherein the non-linearly predicted category determined by the deep learning model is determined by processing each page of the document relative to at least one other page of the document.

13. The method of claim 8, further comprising:
smooth the classifications by:
determining a number of pages preceding a respective page and following the respective page to assess for smoothing;
for each page of the document, assessing the classifications for the number of pages preceding the respective page, if present, and the classifications for the number of pages following the respective page, if present; and
if the classifications for the number of pages preceding the respective page and the classifications for the number of pages following the respective page are the same and differ from the classification of the respective page, modifying the predicted category of respective page.

14. The method of claim 8, wherein the document is an unstructured medical record comprising a plurality of sections provided by distinct sources and concatenated together.

15. A computer program product for classifying pages of a document into predefined categories, the computer program product comprising at least one non-transitory computer-readable storage medium having computer-executable program code instructions stored therein, the computer-executable program code instructions comprising program code instructions to:
receive the document comprising a plurality of pages;
with a linear model, process each page of the document to determine a linearly predicted category from the predefined categories;
with a deep learning model, process each page of the document to determine a non-linearly predicted category from the predefined categories; and for each page of the document, determine a classification by determining which of the linearly predicted category or the non-linearly predicted category to use to classify the respective page as one of the predefined categories.

16. The computer program product of claim 15, wherein determining which of the linearly predicted category or the non-linearly predicted category to use to classify the respective page as one of the predefined categories comprises:
   accessing a linear list associated with the linear model, the linear list comprising categories identified as frequently reflecting a correct classification when predicted by the linear model using training data;
   if the linear list comprises the linearly predicted category, using the linearly predicted category to classify the respective page; and
   if the linear list does not comprise the linearly predicted category, using the non-linearly predicted category to classify the respective page.

17. The computer program product of claim 16, wherein pages of the training data having confirmed categories on the linear list associated with the linear model reflect greater consistency of expected words on the respective page relative to a consistency of expected words on pages of the training data having confirmed categories not on the linear list.

18. The computer program product of claim 15, wherein determining which of the linearly predicted category or the non-linearly predicted category to use to classify the respective page as one of the predefined categories comprises:
   accessing a linear list associated with the linear model, the linear list comprising categories identified as frequently reflecting a correct classification when predicted by the linear model using training data;
   if the linear list comprises the linearly predicted category, determining whether a probability of the linearly predicted category being a correct classification satisfies a predetermined threshold;
   if the linear list comprises the linearly predicted category and the probability satisfies the predetermined threshold, using the linearly predicted category to classify the respective page; and
   if the linear list does not comprise the linearly predicted category or the probability does not satisfy the predetermined threshold, using the non-linearly predicted category to classify the respective page.

19. The computer program product of claim 15, wherein the computer-executable program code instructions further comprise program code instructions to:
   smooth the classifications by:
      determining a number of pages preceding a respective page and following the respective page to assess for smoothing;
      for each page of the document, assessing the classifications for the number of pages preceding the respective page, if present, and the classifications for the number of pages following the respective page, if present; and
      if the classifications for the number of pages preceding the respective page and the classifications for the number of pages following the respective page are the same and differ from the classification of the respective page, modifying the predicted category of respective page.

20. The computer program product of claim 15, wherein the document is an unstructured medical record comprising a plurality of sections provided by distinct sources and concatenated together.

\* \* \* \* \*

UNITED STATES PATENT AND TRADEMARK OFFICE
CERTIFICATE OF CORRECTION

| | |
|---|---|
| PATENT NO. | : 10,997,405 B1 |
| APPLICATION NO. | : 16/673412 |
| DATED | : May 4, 2021 |
| INVENTOR(S) | : Lam et al. |

It is certified that error appears in the above-identified patent and that said Letters Patent is hereby corrected as shown below:

In the Specification

Column 12, Line 13: Please correct "MILL" to read -- IBILL --

Signed and Sealed this
Fifth Day of July, 2022

Katherine Kelly Vidal
*Director of the United States Patent and Trademark Office*